United States Patent [19]
Wussmann et al.

[11] Patent Number: 5,873,230
[45] Date of Patent: Feb. 23, 1999

[54] PNEUMATIC PRESSING SYSTEM FOR A DRAFTING FRAME OF A SPINNING MACHINE AND METHOD OF OPERATING SAME

[75] Inventors: Holger Wussmann, Filderstadt; Reinhold Weber, Hochdorf; Ernst Halder, Wäschenbeuren, all of Germany

[73] Assignee: Zinser Textilmaschinen GmbH, Ebersbach/Fils, Germany

[21] Appl. No.: 989,712

[22] Filed: Dec. 12, 1997

[30] Foreign Application Priority Data

Dec. 17, 1996 [DE] Germany .................. 196 52 372.9

[51] Int. Cl.$^6$ ............................................. D01H 5/28
[52] U.S. Cl. ............................... 57/315; 19/236; 19/250; 19/261; 19/266; 19/270; 19/272; 57/264
[58] Field of Search ...................... 57/315, 264, 317; 19/0.22, 236, 248, 250, 261, 266, 270, 272

[56] References Cited

U.S. PATENT DOCUMENTS

| | | | |
|---|---|---|---|
| 4,510,648 | 4/1985 | Mori et al. | 19/266 |
| 5,400,582 | 3/1995 | Hartmeier et al. | 57/264 |
| 5,583,781 | 12/1996 | Denz et al. | 19/236 |
| 5,761,772 | 6/1998 | Clapp et al. | 19/260 |

FOREIGN PATENT DOCUMENTS 38 10 998  10/1989  Germany .
296 09 348  9/1996  Germany .

*Primary Examiner*—William Stryjewski
*Attorney, Agent, or Firm*—Herbert Dubno

[57] ABSTRACT

In the pneumatic pressing of textile strands in a drafting frame the pressure in the pressure line is monitored by a pressure sensor and/or a flowmeter and used to control a value between the pressure source and that pressure line. According to the invention a disturbance signal is outputted when the pressure in the line drops below a threshold, the control signal for the valve exceeds a threshold, the displacement of the value member exceeds a certain level and the flow rate exceeds a value so as to indicate leakage beyond a tolerance level.

16 Claims, 3 Drawing Sheets

PNEUMATIC PRESSING SYSTEM FOR A DRAFTING FRAME OF A SPINNING MACHINE AND METHOD OF OPERATING SAME

SPECIFICATION

FIELD OF THE INVENTION

The present invention relates to an apparatus for monitoring leakage in a pressure line of at least one pneumatic loading unit for a drafting frame of a spinning machine and to a method of operating such a drafting frame or of monitoring such leakage.

BACKGROUND OF THE INVENTION

In a spinning or other textile machine, it is common to provide a drafting frame which may comprise a set of lower rollers or a combination of such rollers and, for example, a moving belt with pressurizing arms which carry upper rollers and/or belts which can press a textile strand to be drafted in the frame against the lower roller and/or belt so that, depending upon the speeds of the rollers or belts successively engaging the strands, the latter can be drawn out or drafted. Drafting frames can be used between the cans supplying the sliver to the roving flyers or spindles in the winding of the roving on bobbins. They can also be provided in the ring spinning or other spinning frames to draft the roving, yarn or other textile strand.

The arms can be pressed toward the lower rollers and/or belt by pneumatic effectors and it is known to provide a system for pressurizing such effectors, which can be piston and cylinder units or an expandable tube with compressed air from a pressure source such as an air compressor through a valve which controls the pressure via a line delivering the compressed air to the pneumatic effectors. A pressure measuring device or sensor can be connected to the line which can also have a flowmeter and a control means for adjusting the valve in response to the pressure and/or the flow.

A system of this type is described in German Utility Model 296 09 348.3. In this system, the flowmeter is a float which is received in a conical tube and whose height can be detected by a sensor alongside the conical tube. Since the leakage loss which can be tolerated and the flow rate of the apparatus are dependent upon the operating pressure, the setting of the sensor must be matched in case of a change in operating pressure. When this matching is not effected, high leakage losses may prevent the desired operating pressure from being achieved. As a result, the requisite pressure at the drafting rollers may not be sufficient and the quality of the yarn which is produced will deteriorate. The importance of such matching will be clear from the fact that with operating pressure of 1.5 to 4 bar in the line supplying the effectors, a deviation of as little as 0.3 bar will result in a fluctuation in the yarn character.

In the German Patent Document 296 09 348.3, moreover, it has been indicated that other flowmeters can be substituted, but there is no suggestion as to how the flow parameters should be varied for different operating pressures or how it might be possible to avoid detrimental fluctuations in the spinning parameters at least to the extent that the system is not overseen continuously be service personnel.

OBJECTS OF THE INVENTION

It is, therefore, the principal object of the present invention to provide an improved drafting frame or system for monitoring a drafting frame, whereby the above mentioned drawback is avoided and problems with earlier systems for monitoring leakage from the pressurization of the drafting frame can be obviated.

Another object of the invention is to provide a method of monitoring a drafting frame so as to avoid the drawback of having to reach flowmeter and pressure sensor characteristics.

It is also an object of the invention to provide a method of and an apparatus for the drafting of textile strands whereby the probability of yarn defects is greatly reduced.

SUMMARY OF THE INVENTION

These objects and others which will become apparent hereafter are attained, in accordance with the invention, in a drafting frame for textile strands in a spinning machine which includes an apparatus for generating the forces applied to the strands in the drafting frame.

According to the invention that apparatus for generating forces in the drafting frame can comprise:

respective pneumatic effectors for developing the forces;

at least one pressure line connected to the effectors;

a pressure source connected to the pressure line;

a valve between the pressure source and the pressure line for regulating pressure in the line;

a pressure measuring device connected to the line between the valve and the effectors;

control means connected between the pressure measuring device and the valve for regulating the valve in response to measured pressure in the line; and means for monitoring leakage from the line for outputting a disturbance signal selectively upon a fall in a pressure in the line below a predetermined threshold where the control means compares an actual pressure value measured in the line with a predetermined setpoint pressure and regulates a position of the valve as a function of a difference between the setpoint pressure and the actual pressure value, upon an increase of a valve-positioning signal above a predetermined threshold where the control means compares an actual pressure value measured in the line with a predetermined setpoint pressure and regulates a position of the valve as a function of a difference between the setpoint pressure and the actual pressure, upon a displacement of a valve member in the valve detected by a position sensor in excess of a threshold position of the valve member, and upon a flow rate in the line detected by a flowmeter exceeding a flow threshold.

The method of the invention, in a system of the type described wherein a pressure measuring device and/or a flowmeter can be connected to the line, can comprise the steps of monitoring leakage from the line, and outputting a disturbance signal selectively upon a fall in a pressure in the line below a predetermined threshold where the control means compares an actual pressure value measured in the line with a predetermined setpoint pressure and regulates a position of the valve as a function of a difference between the setpoint pressure and the actual pressure value, upon an increase of a valve-positioning signal above a predetermined threshold where the control means compares an actual pressure value measured in the line with a predetermined setpoint pressure and regulates a position of the valve as a function of a difference between the setpoint pressure and the actual pressure, upon a displacement of a valve member in the valve detected by a position sensor in excess of a threshold position of the valve member, and upon a flow rate in the line detected by a flowmeter exceeding a flow threshold.

In a first embodiment of the invention, wherein the control device sets the valve as a function of a predetermined setpoint and an actual value of the pressure in the line detected by the pressure measuring device downstream of a flow resistance (which can be the flowmeter) and the signal is generated when the detected pressure falls below a threshold, use is made of the fact that in the pressurizing line, the flow resistance gives rise to a pressure drop which increases with increasing leakage loss. With a sufficiently high leakage loss, the determined setpoint pressure can no longer be maintained. In a second embodiment of the invention wherein the position of the valve member is a function of valve setting signal and the disturbance signal is emitted when the vale setting signal exceeds a threshold value, use is made of the fact that with increasing leakage loss the control means must provide a control signal of increasing amplitude to open the valve more widely. This valve operating signal is a function of the leakage loss. In the third embodiment of the invention wherein the valve is provided with a position detector, there is also a greater displacement of the valve member as a function of the attempt by the control means to correct for the leakage loss and instead of operating the valve monitoring system the invention can monitor directly the position of the valve members. In the fourth embodiment of the invention, the flow rate is used directly as a measure of leakage.

For pressurization of the line and, therefore filling of the system with a pressurized fluid, there is a much higher volumetric demand than is required to maintain the pressure and, since a flowmeter or flow resistance or constriction in the line would hinder such filling or initial pressurization, it has been found to be advantageous, according to the invention, to provide a bypass valve across the flowmeter or constriction which is effective for the filling operation and thus prevents the system from issuing the disturbance signal in the case of filling.

Since certain working pressures of the pressing system are dependent upon certain spinning parameters, and the respective thresholds and certain minimum pressures must be maintained and only certain leakage rates can be tolerated, it has been found to be advantageous in accordance with another feature of the invention to provide a data storage unit which can store the various parameters including the spinning parameters, leakage parameters, pressure parameters and thresholds and to provide such a storage unit in conjunction with means for reading into storage and reading out of storage pairs of related parameters for use in the control process or for display in association with the spinning parameters for selection or information to the operator.

The data set can correspond to an entire spinning program which can be modified, read out for verification or reproduced for use in other drafting frames.

Since it has been found that each drafting frame tends to have a leakage rate which is more or less individual thereto, an algorithm can be provided for the control system which allows compensation for the leakage and signalling of a failure to correct for the leakage which is specific to each drafting frame, although the algorithm may be common to drafting frames of the same or different types.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
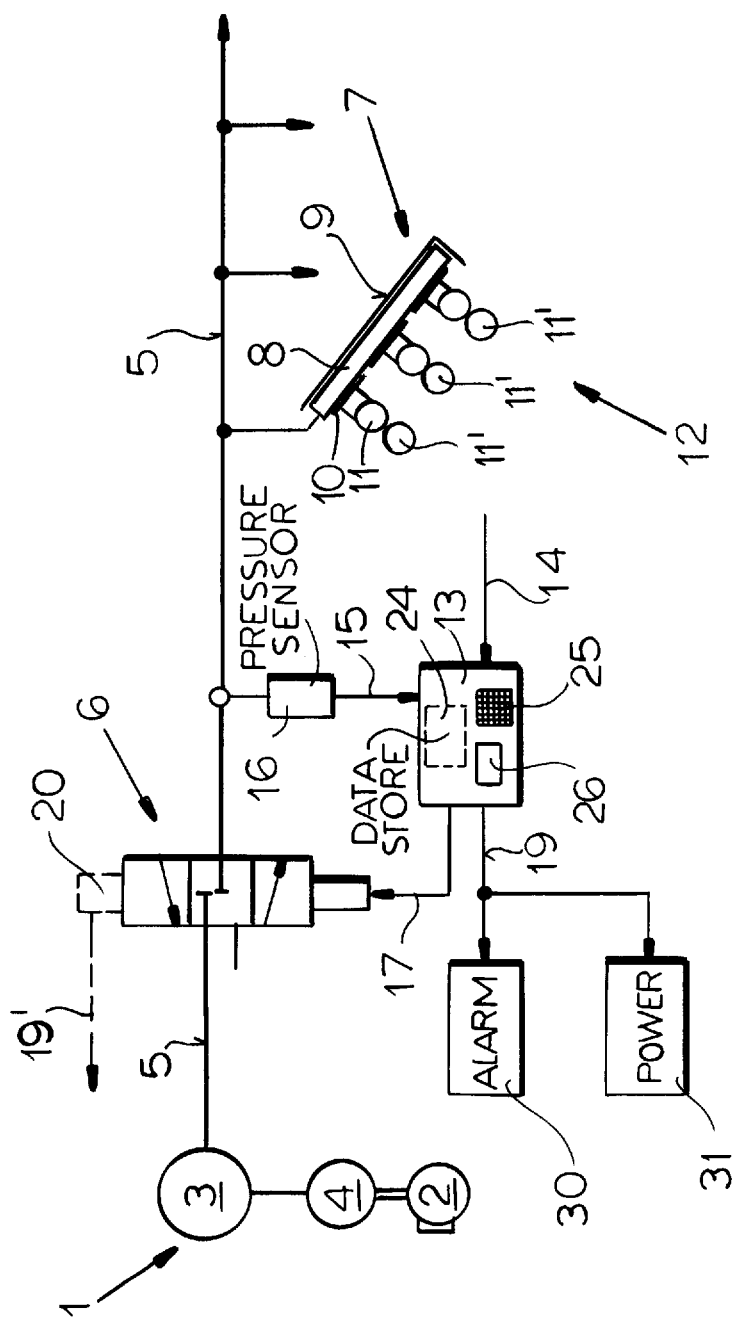
FIG. 1 is a flow diagram illustrating the application of a pressing force to a drafting frame in accordance with one aspect of the invention.

In all of the figures of the drawing, a compressed air source, generally represented at 1, is provided to generate the fluid under pressure which is applied to the pressing arms of the drafting frame as will be described in greater detail.

The source 1 can include an electric motor 2 driving a compressor 4, representing a fluid pressurizing pump, which can feed a pressure accumulator 3 which, in the case of compressed air, can be a compressed air tank.

The source 1 is connected via the pressure line 5 with a multiplicity of pressing units 7 of a drafting frame for a spinning machine. The pressing unit 7 may be pneumatically actuated piston and cylinder arrangements, not shown in detail, which are provided in or on the arm 9 which presses the upper rollers 11 against a strand passing between the upper rollers 11 and lower rollers 11'. Alternatively, the pressurizing unit 7 can include an expandable tube 8 in each arm 9 which bears upon pressing shoes 10 urging the rollers 11 against the strand.

The drafting frame as a whole has been represented at 12 and the lower rollers 11' can be driven at progressively increasing speeds along the path of the strand. The rollers 11' may be common to all of the arms 9 and each arm 9 may be assigned to one or more spinning stations.

Along the pressure line 5 there is provided a preferably electromagnetic valve 6 which can be configured as a 3-port, 3-position (3/3) valve 6.

As can be seen from the drawing as well, the line 5 feeds all of the pressing units 7 or at least a group of the pressing units of the drafting frame.

The pressure line can, where necessary, be provided with flexible conduit to allow the arms 9 to swing up and down as is conventional or to facilitate the locating of the pressure line on the machine, the flexible conduits being connected with rigid sections by one or more couplings.

As a consequence it is practically unavoidable that, along the line 5 and in the system downstream of the valve 6, leakage will occur and hence that a greater or lesser amount of the pressurizing medium may have to be supplied.

When the leakage loss exceeds a certain magnitude, this must be noted and, for example, the machine brought to standstill to avoid deterioration of the quality of the yarn produced.

For this purpose a control means in the form of a computer 13 is provided which can be supplied with a setpoint value 14 which represents the control point for the system. The setpoint input may be applied by a keyboard, numerical pad or other setpoint generator.

An actual value input is provided at 15 and represents the measured value of the pressure in line 5. This measured value derives from a pressure sensor 16 connected to the line 5 downstream of the valve 6.

The controller or computer 13 compares the actual value signal with the setpoint signal and produces a control signal 17 which can be referred to as a valve setting signal to operate the valve 6 so as to correct the pressure in line 5 to compensate for any deviation from the setpoint signal supplied at 14.

Naturally, with leakage losses in the pressure line 5 there is a pressure drop therein which is corrected, to the extent possible, by the control means 13 via further opening of the valve 6. When an increasing leakage loss does not allow further correction by the control means 13 and the pressure in line 5 thus falls below a correctable level, this pressure drop, detected by the pressure sensor 16 is evaluated by the control unit 13 and upon the pressure falling below a first threshold stored in the unit 13, initially gives rise to a prewarming signal on line 19 which can be an audible or visible signal at the alarm 30. If there is no response to this alarm and the pressure continues to fall to a point below a second threshold or should drop suddenly below that second threshold because of a rupture n the line 5, the signal operates a power controller 31 cutting off all power to the machine and automatically bringing the machine to standstill.

The preliminary warning signal is intended to alert service personnel and if there has been no response can also give rise to a shut down of the machine or, if desired, the machine can be shut down automatically and an alarm signal triggered by the shut down can be set off to alert service personnel.

The outputting of such a disturbance signal at 19 when the setpoint pressure in the pressure line 5 cannot be reached or maintained, is not only advantageous in the case of leakage losses but also can signal a failure of the source 1 and will avoid the production of poor quality yarn in the case of such failure as well.

As has already been indicated, the controller 13 opens the valve 6 further upon detection of a pressure drop in line 5. The opening of the valve 6 is itself a measure of the degree of leakage loss. It is thus possible to output at 19' a signal which represents the magnitude of the displacement of the valve member of valve 6 which can be detected by a position sensor 20. In this case the alarm or the shut down unit can be connected to the sensor 20 to be operated by the output 19'. The output 19 can, of course, be a signal which is generated upon the magnitude of the valve setting signal exceeding a threshold.

Figure 2:
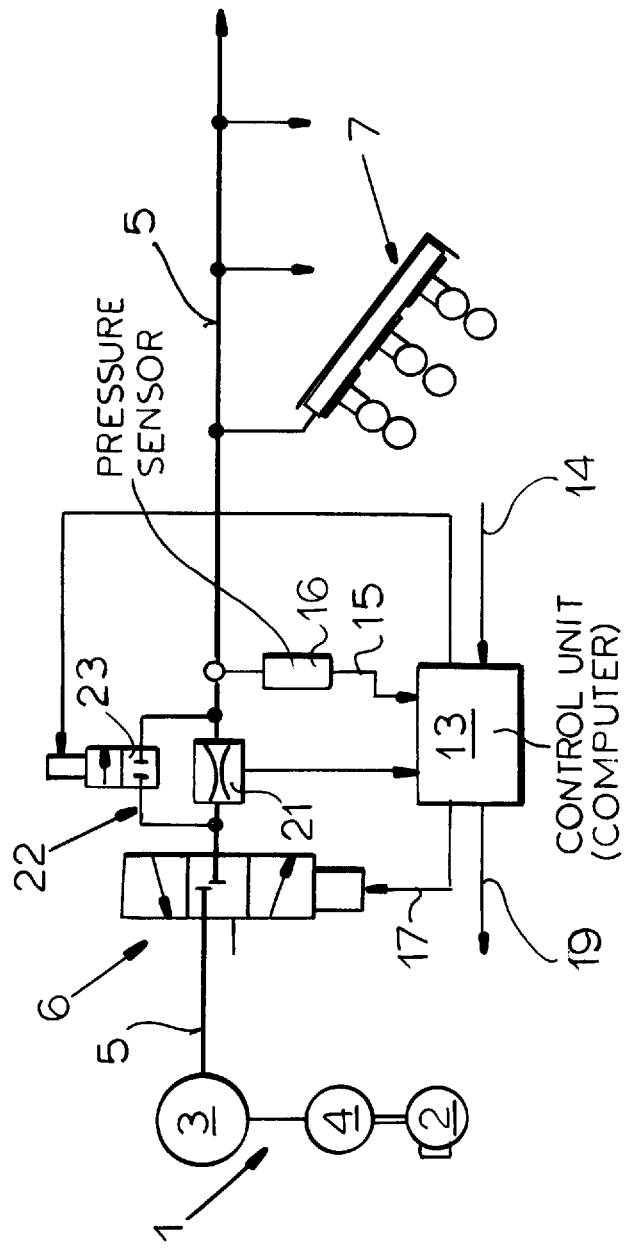
FIG. 2 is a view similar to FIG. 1 of a system in which a bypass valve is provided across the flowmeter.

In the embodiment of FIG. 2, the pressure line 5 includes a flowmeter 21 which is connected with the controller 13. In this system the controller 13 emits the prewarming or shut down signal (disturbance signal) when after an initial filling of line 5, the flowmeter signals a flow of the pressurizing medium which exceeds an adjustable threshold and thus excessive leakage.

Since the flowmeter 21 is a flow resistance and thus can hinder the initial filling or pressurization of the line 5, we can provide a valve 23 in a bypass 22 across the flowmeter 21. This valve can be in the form of a 2-port, 2-position (2/2) valve which is operated by the controller 23 lining the filling of line 5 to bypass the flowmeter 21. When rapid filling is complete, valve 23 is closed and the flowmeter is again active.

Figure 3:
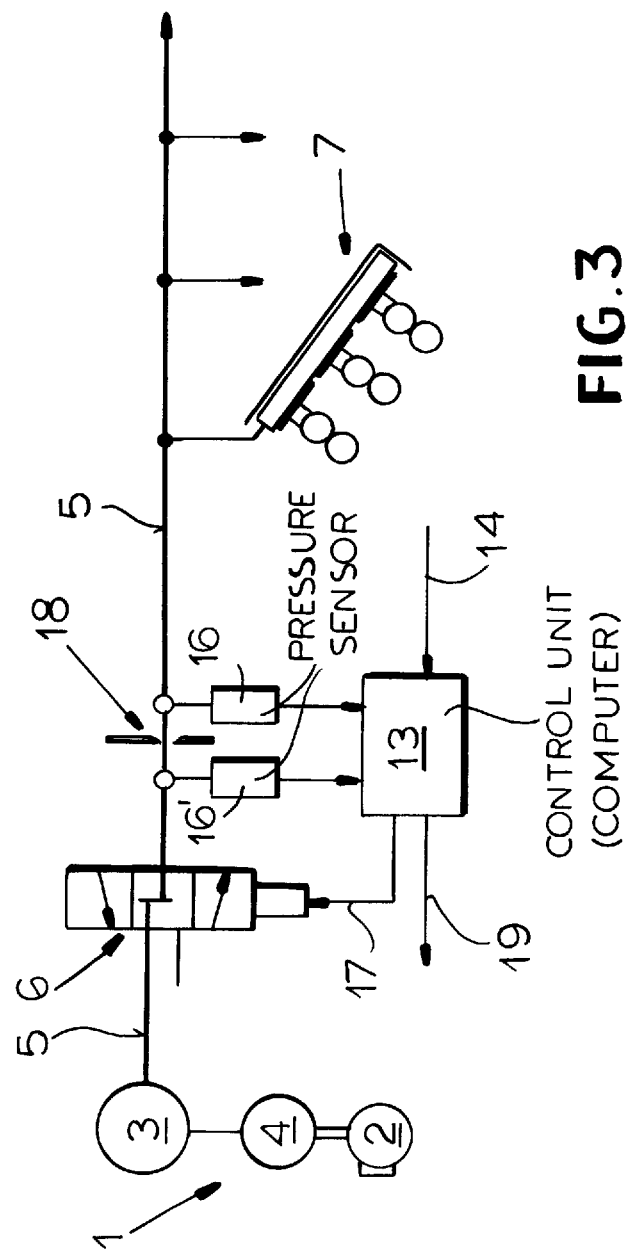
FIG. 3 is a view similar to FIG. 1 of an embodiment in which the flowmeter utilizes a constriction or flow resistance having pressure detectors upstream and downstream thereof.

A bypass 22 with such a valve can also be provided for the flow resistance 18 in FIG. 3.

The flowmeter in FIG. 3 comprises the constriction 18, which can be in the form of a diaphragm with an orifice, and a pair of pressure sensors 16 and 16' ahead of and behind the constriction. A pressure drop across the orifice 18 is detected and the pressure difference represents a flowing input to the control unit 13. When the flow rate increases, as thus detected above a threshold representing excessive leakage the disturbance signal is emitted.

The pressure sensor 16 in FIG. 3 can form the pressure sensor providing the actual value for control of the valve 6. Control and regulating valves can be integrated into the control unit 23 to output a fluid pressure for operating the valve 6 or controlling the pressure in line 5 when supplied with the setpoint and actual pressures.

Advantageously, however, the control unit is a computer having a data storage or memory 24 in which the data of the setpoint for the working pressure in the pressure line 5 and the thresholds for leakage can be stored. The keyboard or other input unit for the data can be represented at 25 and can be utilized to input other data as can be reviewed on the display 26 so that, for example, the spinning parameters insofar that they are relevant to the working pressure and the leakage insofar that it is relevant to matters like the fineness of the spun yarn, staple length of the spun fibers, the spacing of the rollers of the drafting frame from one another and the like can be stored or used to control the operation and signal excess leakage. As may be required, the program of the control unit 13 can be read back, revised or replaced by a new program outputted into the computer.

After the spinning machine has been brought to standstill, it may be desirable to renew the spinning data, revise the spinning data or restore operation using an activated data set from the memory 24 or requiring another data set to be activated. In this manner it is possible to avoid spinning a defective product in the case where leakage thresholds are crossed. The data storage can be so configured that it allows readout of pressure, valve position, flow rate and leakage values in their respective relationships so that it is possible, for instance, to enable long term trends in leakage to be recognized and compensate or corrected before a threshold is reached.

We claim:

1. In a drafting frame for textile strands in a spinning machine, an apparatus for generating forces applied to said strands therein and comprising:

respective pneumatic effectors for developing said forces;

at least one pressure line connected to said effectors;

a pressure source connected to said pressure line;

a valve between said pressure source and said pressure line for regulating pressure in said line;

a pressure measuring device connected to said line between said valve and said effectors;

control means connected between said pressure measuring device and said valve for regulating said valve in response to measured pressure in said line; and means for monitoring leakage from said line for outputting a disturbance signal selectively upon a fall in a pressure in said line below a predetermined threshold where said control means compares an actual pressure value measured in said line with a predetermined setpoint pressure and regulates a position of said valve as a function of a difference between said setpoint pressure and said actual pressure value, upon an increase of a valve-positioning signal above a predetermined threshold where said control means compares an actual pressure value measured in said line with a predetermined setpoint pressure and regulates a position of said valve as a function of a difference between said setpoint pressure and said actual pressure, upon a displacement of a valve member in said valve detected by a position sensor in excess of a threshold position of said valve member, and upon a flow rate in said line detected by a flowmeter exceeding a flow threshold.

2. The apparatus defined in claim 1 wherein said control means includes means for generating said disturbance signal upon a fall in a pressure in said line below a predetermined threshold where said control means compares an actual pressure value measured in said line with a predetermined setpoint pressure and regulates a position of said valve as a function of a difference between said setpoint pressure and said actual pressure value.

3. The apparatus defined in claim 1 wherein said control means includes means for generating said disturbance signal upon an increase of a valve-positioning signal above a predetermined threshold where said control means compares an actual pressure value measured in said line with a predetermined setpoint pressure and regulates a position of said valve as a function of a difference between said setpoint pressure and said actual pressure.

4. The apparatus defined in claim 1 wherein said control means includes means for generating said disturbance signal upon a displacement of a valve member in said valve detected by a position sensor in excess of a threshold position of said valve member.

5. The apparatus defined in claim 1 wherein said control means includes means for generating said disturbance signal upon a flow rate in said line detected by a flowmeter exceeding a flow threshold.

6. The apparatus defined in claim 5 wherein said flowmeter comprises a flow resistance in said line and respective pressure sensors connected to said line upstream and downstream of said flow resistance.

7. The apparatus defined in claim 6, further comprising a bypass valve bridging said flow resistance for initial pressurization of said line.

8. The apparatus defined in claim 5, further comprising a bypass valve bridging said flowmeter for initial pressurization of said line.

9. The apparatus defined in claim 1 wherein said control means further comprises data storage means for recording said pressures, said thresholds and spinning parameters and from which stored values can be read.

10. The apparatus defined in claim 1 wherein said control means encompasses a routine whereby following standstill of the machine or a changeover of spinning parameters thereof operation of said means for monitoring is initiated after activation of a data set of restoration of an active data set to control.

11. The apparatus defined in claim 10 wherein said data storage means is configured to store and read back detected leakage values.

12. A method of operating a drafting frame in a spinning machine wherein respective pneumatic effectors develop forces on textile strands drafted in said drafting frame, at least one pressure line is connected to said effectors, said pressure line is pressurized by a pressure source through a valve between said pressure source and said pressure line for regulating pressure in said line, a pressure measuring device is connected to the line between the valve and the effectors and said valve is regulated in response to measured pressure in said line by the pressure measuring device through a control means, said method comprising the steps of monitoring leakage from said line, and outputting a disturbance signal selectively upon a fall in a pressure in said line below a predetermined threshold where said control means compares an actual pressure value measured in said line with a predetermined setpoint pressure and regulates a position of said valve as a function of a difference between said setpoint pressure and said actual pressure value, upon an increase of a valve-positioning signal above a predetermined threshold where said control means compares an actual pressure value measured in said line with a predetermined setpoint pressure and regulates a position of said valve as a function of a difference between said setpoint pressure and said actual pressure, upon a displacement of a valve member in said valve detected by a position sensor in excess of a threshold position of said valve member, and upon a flow rate in said line detected by a flowmeter exceeding a flow threshold.

13. The method defined in claim 12 wherein said disturbance signal is outputted upon a fall in a pressure in said line below a predetermined threshold where said control means compares an actual pressure value measured in said line with a predetermined setpoint pressure and regulates a position of said valve as a function of a difference between said setpoint pressure and said actual pressure value.

14. The method defined in claim 12 wherein said disturbance signal is outputted upon an increase of a valve-positioning signal above a predetermined threshold where said control means compares an actual pressure value measured in said line with a predetermined setpoint pressure and regulates a position of said valve as a function of a difference between said setpoint pressure and said actual pressure.

15. The method defined in claim 12 wherein said disturbance signal is outputted upon a displacement of a valve member in said valve detected by a position sensor in excess of a threshold position of said valve member.

16. The method defined in claim 12 wherein said disturbance signal is outputted upon a flow rate in said line detected by a flowmeter exceeding a flow threshold.

* * * * *